United States Patent
Kal

(10) Patent No.: US 6,654,647 B1
(45) Date of Patent: Nov. 25, 2003

(54) METHOD FOR CONTROLLING AN AUTOMATIC GUIDED VEHICLE SYSTEM

(75) Inventor: Myung-joon Kal, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 494 days.

(21) Appl. No.: 09/659,569

(22) Filed: Sep. 11, 2000

(30) Foreign Application Priority Data

Nov. 4, 1999 (KR) .......................................... 1999-48563

(51) Int. Cl.⁷ .............................................. G05B 15/02
(52) U.S. Cl. ................................ 700/9; 700/19; 700/20; 700/113; 701/1; 701/2; 701/3; 701/4; 701/11; 701/23; 701/24; 701/25; 701/26; 701/27; 701/28; 710/52; 180/167; 180/168; 180/169; 318/587; 901/1
(58) Field of Search ..................... 700/9, 113, 19–20; 710/52; 180/167–169; 318/587; 701/1–4, 11, 23–28; 901/1

(56) References Cited

U.S. PATENT DOCUMENTS

| | | | | |
|---|---|---|---|---|
| 4,875,172 A | * | 10/1989 | Kanayama | 701/23 |
| 5,698,817 A | * | 12/1997 | Hillenbrand | 114/21.2 |
| 5,781,119 A | * | 7/1998 | Yamashita et al. | 340/903 |
| 5,901,805 A | * | 5/1999 | Murakami et al. | 180/168 |
| 6,049,745 A | * | 4/2000 | Douglas et al. | 701/23 |
| 6,088,742 A | * | 7/2000 | Sim | 710/52 |
| 6,092,010 A | * | 7/2000 | Alofs et al. | 701/23 |
| 6,349,898 B1 | * | 2/2002 | Leonard et al. | 244/3.15 |
| 6,487,953 B1 | * | 12/2002 | McIngvale | 89/41.05 |

FOREIGN PATENT DOCUMENTS

| | | |
|---|---|---|
| JP | 06-217423 | 8/1994 |
| JP | 09-282034 | 10/1997 |
| JP | 11-085277 | 3/1999 |

OTHER PUBLICATIONS

"Notification of the Reasons for Objection" issued by Japanese Patent Office dated on Jan. 7, 2003 in corresponding co-pending Japanese patent application 2000–287395 filed on the 21st day of Sep. 2000.

* cited by examiner

Primary Examiner—Anil Khatri
Assistant Examiner—Douglas M. Shute
(74) Attorney, Agent, or Firm—Robert E. Bushnell, Esq.

(57) ABSTRACT

A method for controlling an automatic guided vehicle system having an automatic guided vehicle and a central controller for controlling the automatic guided vehicle is capable of operating with improved operational efficiency. The control method includes the steps of: transmitting of an IMMEDIATE command by the central controller to the automatic guided vehicle; checking by the central controller as to whether the automatic guided vehicle, which is performing the IMMEDIATE command, can receive a NEXT command; transmitting of the NEXT command by the central controller to the automatic guided vehicle; continuous receiving, analyzing, and storing of the NEXT command by the automatic guided vehicle while the automatic guided vehicle receives and performs the IMMEDIATE command; and sequentially performing NEXT commands stored in the automatic guided vehicle after completion of the IMMEDIATE command.

9 Claims, 4 Drawing Sheets

METHOD FOR CONTROLLING AN AUTOMATIC GUIDED VEHICLE SYSTEM

CLAIM OF PRIORITY

This application makes reference to, incorporates the same herein, and claims all benefits accruing under 35 U.S.C. §119 from an application for METHOD FOR CONTROLLING A SYSTEM OF AUTOMATIC GUIDED VEHICLES earlier filed in the Korean Industrial Property Office on the 4$^{th}$ of November 1999 and there duly assigned Ser. No. 99-48563.

BACKGROUND OF THE INVENTION

1. Field of the Invention

The present invention relates to a method for controlling an Automatic Guided Vehicle system (AGV system), and more particularly, to a method for controlling an AGV system capable of efficiently controlling a plurality of automatic guided vehicles.

2. Description of the Related Art

Generally, with reference to FIG. 1, an AGV system such as an automatic assembly line, etc., includes a plurality of automatic guided vehicles 20, and a central controller 10 for controlling the movement and performance of the automatic guided vehicles 20. Wireless communicators 12 and 21 are provided between the automatic guided vehicles 20 and the central controller 10 for intercommunication therebetween. Accordingly, the control method includes a control method of the central controller 10, and a control method of the automatic guided vehicles 20.

After checking the status of the whole system, the central controller 10 sends out operation commands to the respective automatic guided vehicles 20 through the wireless communicator 12 in a certain communication format. Each automatic guided vehicle 20 receives the commands from the central controller 10 through another wireless communicator 21. According to the command it received, the automatic guided vehicle 20 moves along a requested guidepath 27, or stops at a requested workstation 25 to load/unload parts, materials, or products, or to perform a charging process.

As shown in the flowchart of FIG. 2, the method of the central controller 10 for controlling the automatic guided vehicles 20 includes the steps of: sending out a new command to the automatic guided vehicle 20 for moving or loading/unloading (Step S41); and checking the completion of the command sent to the automatic guided vehicle 20 (Step S42). When determining the completion of the command at the automatic guided vehicle 20, a new command is analyzed and the steps of sending out new commands, and checking the completion of each new command (S41 and S42) are repeated.

When the automatic guided vehicle 20 receives a command from the central controller 10, the automatic guided vehicle 20 moves to a newly requested location to perform the loading/unloading of parts and completes the command it received, and reports the completion of the command to the central controller 10.

More specifically, the control method of the automatic guided vehicles 20 includes the steps of: receiving the command transmitted by the central controller 10; command performance by the automatic guided vehicles 20; reporting command completion by the automatic guided vehicles 20; reception of the command completion report by the central controller 10; and transmission of a new command by the central controller 10.

According to the conventional control method, since the central controller 10 transmits a new command only after the central controller 10 receives the previous command completion report from the automatic guided vehicle 20, communication time is consumed for reporting the command completion and receiving a new command at the automatic guided vehicle 20 between each task.

Further, since it takes time for the automatic guided vehicle 20 to analyze the command received from the central controller 10 and convert the command to an appropriate form, the command cannot be directly carried out by the automatic guided vehicle 20 when the automatic guided vehicle 20 receives the command from the central controller 10.

When the central controller 10 controls a plurality of automatic guided vehicles 20 simultaneously, in particular, sometimes it takes a lengthy time for the central controller 10 to analyze the commands for the automatic guided vehicles 20, and thus the central controller 10 keeps the automatic guided vehicles 20 waiting for the new commands, thereby lengthening the communication time for the automatic guided vehicles 20.

Here, due to a need for communication time and command analyzing time between performance of each command given to the automatic guided vehicles 20, the conventional control system had an operational efficiency problem.

SUMMARY OF THE INVENTION

The present invention has been developed to overcome the above-mentioned problems of the related art, and accordingly, it is an object of the present invention to provide a method for controlling an AGV system having a central controller that sends out a new command to an automatic guided vehicle which is performing the command it previously received from the central controller, the method being capable of reducing communication time and command analyzing time between the respective command performances of the automatic guided vehicles thus improving the operational efficiency.

The above object is accomplished by a method for controlling an AGV system having a plurality of automatic guided vehicles and a central controller for controlling the automatic guided vehicles according to the present invention, including the steps of: (a) transmitting an IMMEDIATE command from the central controller to the automatic guided vehicle; (b) checking by the central controller as to whether the automatic guided vehicle, which is performing the IMMEDIATE command, can receive a NEXT command; (c) transmitting the NEXT command by the central controller to the automatic guided vehicle; (d) continuously receiving, analyzing, and storing of the NEXT command by the automatic guided vehicle while the automatic guided vehicle receives and performs the IMMEDIATE command; and (e) sequentially performing NEXT commands stored in the automatic guided vehicle after completion of the IMMEDIATE command.

Step (b) includes the steps of: checking by the central controller as to whether there is a NEXT command to send out to the automatic guided vehicle; and checking by the central controller as to whether the automatic guided vehicle can receive the NEXT command. This is followed by step (c) of transmitting of the NEXT command by the central controller to the automatic guided vehicle.

Further, step (b) includes the steps of: receiving of the NEXT command by the automatic guided vehicle from the central controller; analyzing and converting of the NEXT command into an execution command of the automatic guided vehicle; and storing of the converted NEXT command by the automatic guided vehicle into a buffer of the automatic guided vehicle.

In the control method of the AGV system according to the present invention, since the receiving and analyzing of the command by the automatic guided vehicle are carried out during the performance of the command that the automatic guided vehicle has previously received from the central controller, communication time and command analyzing time of the central controller and the automatic guided vehicle can be saved. Accordingly, the operational efficiency of the AGV system is improved.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, the preferred embodiment of the present invention will be described in greater detail with reference to the accompanying drawing.

Figure 1:
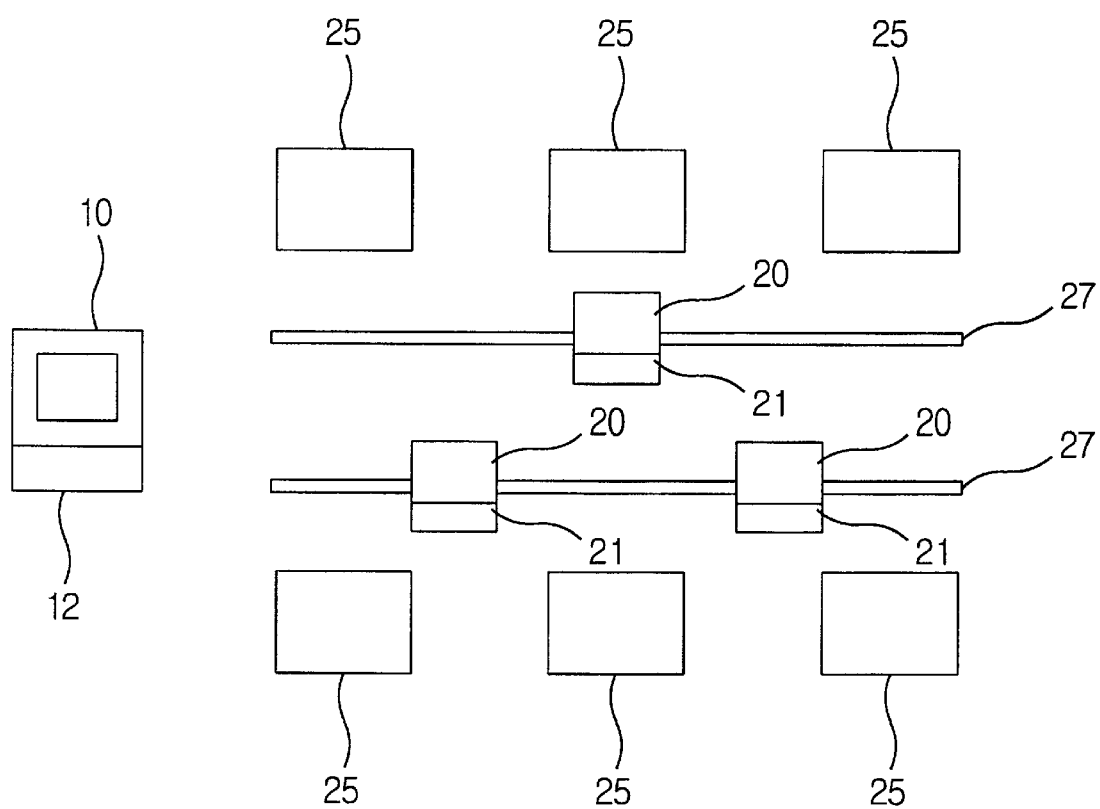
FIG. 1 is a schematic view of an AGV system utilizing a preferred embodiment of the method of the present invention.
Figure 2:
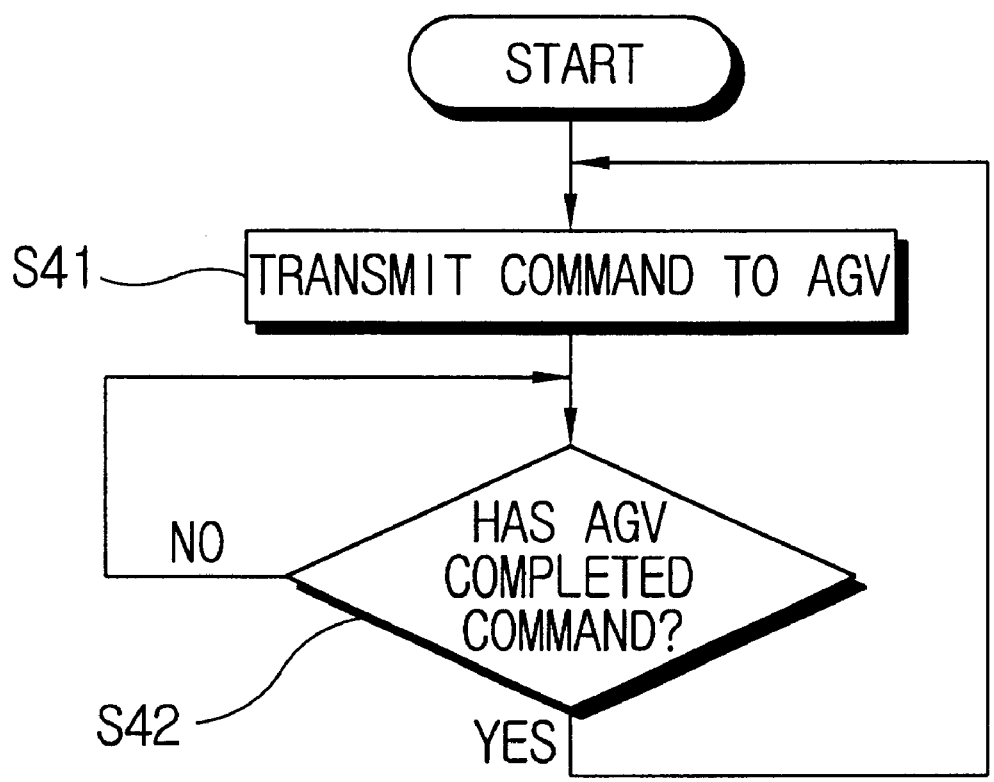
FIG. 2 is a flow chart illustrating operation of a central controller of a conventional AGV system control method.

Throughout the description, the term "command" hereinafter will include an "IMMEDIATE command" and a "NEXT command". Here, the IMMEDIATE command corresponds to a command which should be executed immediately by the automatic guided vehicle 20 (FIG. 1) upon receipt of the same from the central controller 10, and the NEXT command corresponds to a command received at the automatic guided vehicle 20 while the automatic guided vehicle 20 is performing the IMMEDIATE command, and the NEXT command should be performed after completion of the IMMEDIATE command.

Figure 3:
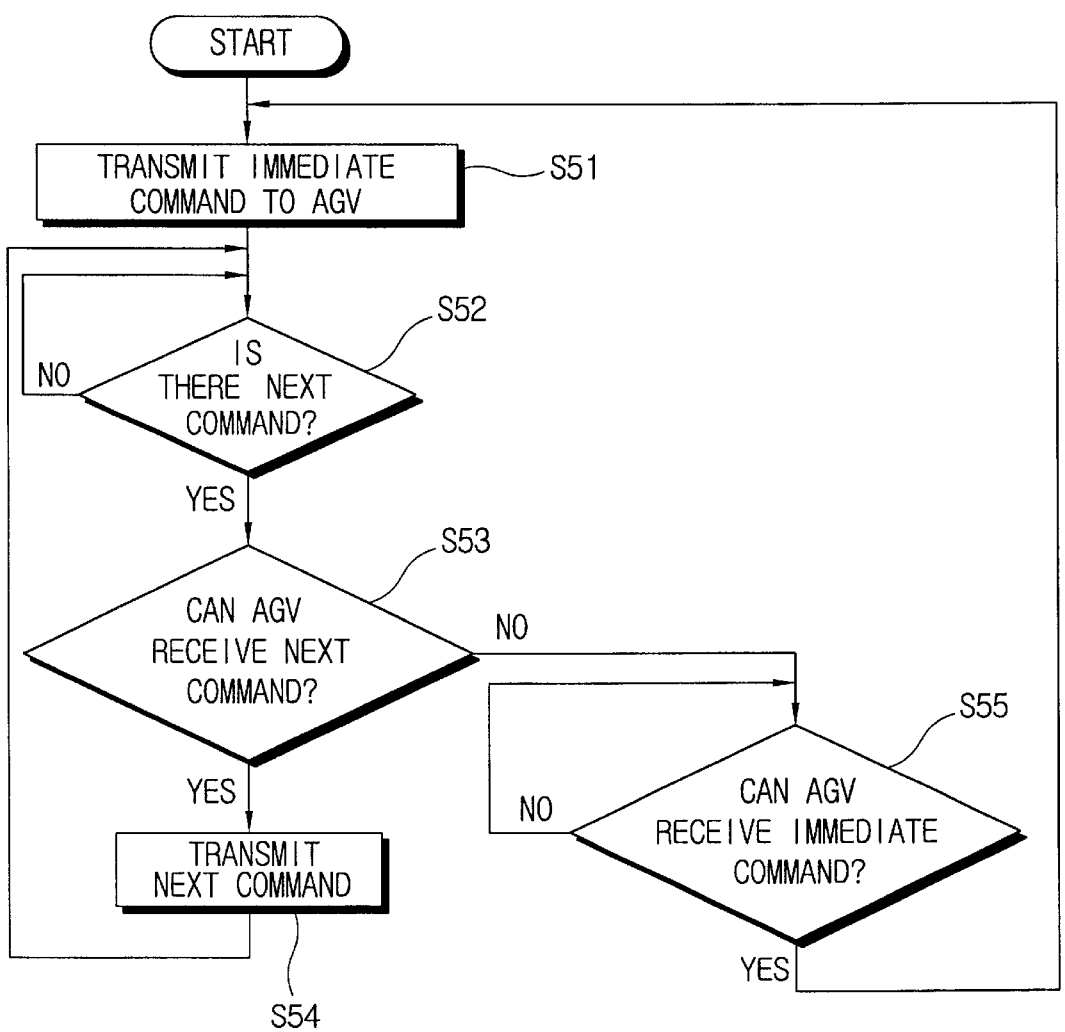
FIG. 3 is a flow chart illustrating the operation of a central controller in accordance with the AGV system control method of the preferred embodiment of the present invention.
Figure 4:
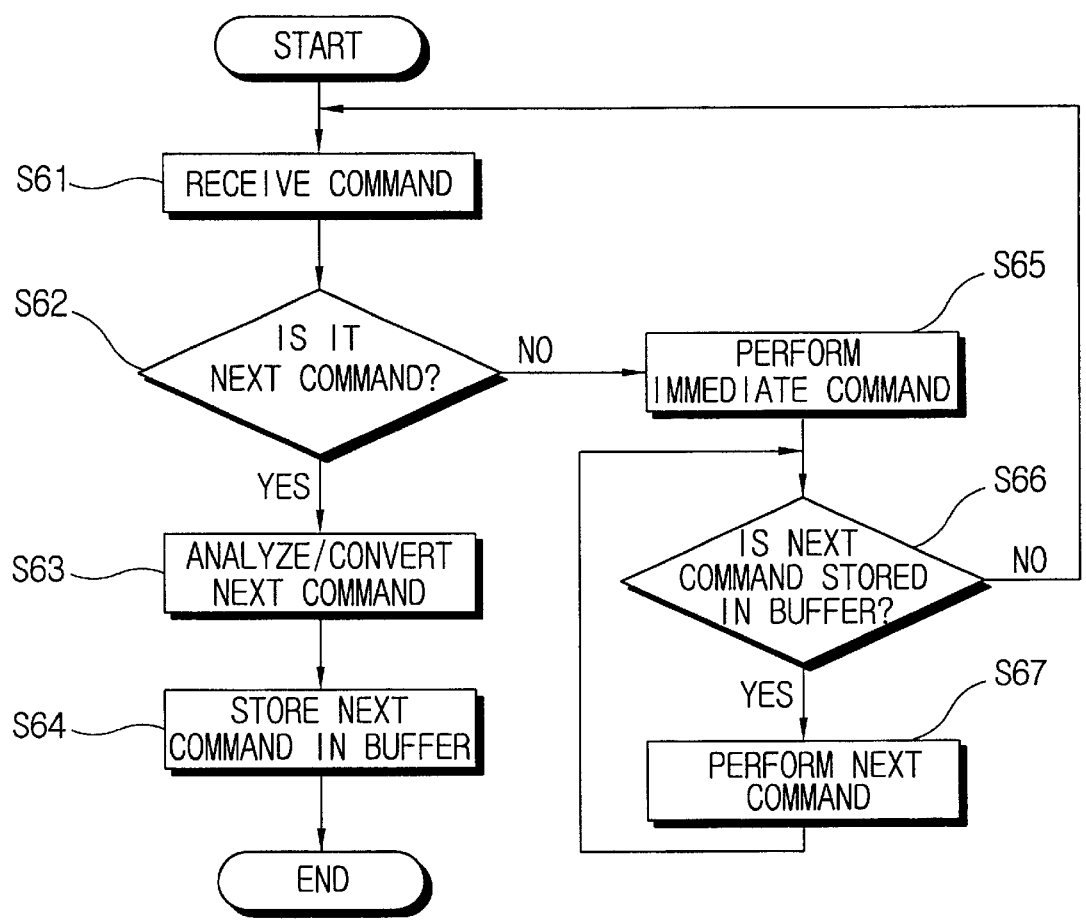
FIG. 4 is a flow chart illustrating the operation of the automatic guided vehicle in accordance with the AGV system control method of the preferred embodiment of the present invention.

FIG. 3 is a flowchart illustrating the operation of the central controller 10 of the AGV system according to the preferred embodiment of the present invention, and FIG. 4 is a flowchart illustrating the operation of the automatic guided vehicle 20 of the AGV system according to the preferred embodiment of the present invention.

The control method of the AVG system according to the present invention mainly includes the steps carried out at the central controller 10 and at the automatic guided vehicle 20.

The processes carried out at the central controller 10 for sending out commands to the automatic guided vehicle 20 will be described in greater detail with reference to FIG. 3.

The central controller 10 sends out the IMMEDIATE command to the automatic guided vehicle 20 (Step S51), and checks whether there is a NEXT command to be performed by the automatic guided vehicle 20 (Step S52). When there is a NEXT command to be performed, the central controller 10 checks whether the automatic guided vehicle 20 is able to receive the NEXT command (Step S53). When determining that the automatic guided vehicle 20 can receive the NEXT command, the central controller 10 transmits the NEXT command (Step S54), and repeats the steps S52 and S53. If the automatic guided vehicle 20 cannot receive the NEXT command, the central controller 10 checks whether the automatic guided vehicle 20 can receive the IMMEDIATE command (Step S55). If the automatic guided vehicle 20 can receive the IMMEDIATE command, the central controller 10 performs step S51, i.e., the central controller 10 sends out the IMMEDIATE command to the automatic guided vehicle 20, and repeats the steps after step S51. If the automatic guided vehicle 20 cannot receive the IMMEDIATE command, the central controller 10 keeps performing S55, i.e., the central controller 10 keeps checking whether the automatic guided vehicle 20 can receive the IMMEDIATE command.

Here, the central controller 10 can distinguish the IMMEDIATE and NEXT commands by the use of a symbol representing the NEXT command added after the symbol representing the communication format data start ("N" of "NEXT command" is used in this embodiment). Accordingly, the command with letter "N" corresponds to the NEXT command, while the command without the letter "N" corresponds to the IMMEDIATE command, which should be immediately performed.

Further, the central controller 10 is enabled to check whether or not the automatic guided vehicle 20 can receive the NEXT command by means of a status report transmitted from the automatic guided vehicle 20 at a certain time interval (500 ms interval in this embodiment). When the central controller 10 sends out a status request command to the automatic guided vehicle 20 requesting a status report, the automatic guided vehicle 20 sends out the status report, including information as to whether or not the automatic guided vehicle 20 can receive the NEXT command to the central controller 10 in response to the status request command. Accordingly, the central controller 10 is enabled to determine whether or not the automatic guided vehicle 20 can receive the NEXT command at a 500 ms time interval.

The steps carried out at the automatic guided vehicle 20 after receiving the NEXT command from the central controller 10 will be described below with reference to the flowchart of FIG. 4.

When the automatic guided vehicle 20 receives the command from the central controller 10 (Step S61), the automatic guided vehicle 20 checks to see if the command is the NEXT command or not (Step S62). If the command is not a NEXT command, the automatic guided vehicle 20 performs the IMMEDIATE command (Step S65). If the command is a NEXT command, the automatic guided vehicle 20, which is performing the IMMEDIATE command, analyzes the NEXT command to determine if it is a moving, loading, unloading, or charging command, and converts the NEXT command into a command form which can be performed by the automatic guided vehicle 20 (Step S63). After that, the automatic guided vehicle 20 stores the NEXT command in a NEXT command storing buffer (not shown) of a control section (not shown) thereof (Step S64).

While receiving the commands from the central controller 10, the automatic guided vehicle 20 performs the IMMEDIATE commands and stores the NEXT commands through the above-described steps. After S65, i.e., after completing the IMMEDIATE command, the automatic guided vehicle 20 checks as to whether or not there is any NEXT command stored in the NEXT command storing buffer (not shown)

(Step S66), and performs the NEXT command if the NEXT command is stored in the storing buffer (not shown) (Step S67) until there is no NEXT command left in the storing buffer (not shown). When there are no NEXT commands stored in the storing buffer (not shown), the automatic guided vehicle 20 performs the command receiving step S61.

Here, the automatic guided vehicle 20 determines the received command to be an IMMEDIATE or a NEXT command by the use of a symbol representing the NEXT command (letter "N" in this embodiment) added to the command communication format transmitted from the central controller 10. Accordingly, the command with letter "N" corresponds to the NEXT command, while the command without the letter "N" corresponds to the IMMEDIATE command.

As described above, according to the present invention, the automatic guided vehicle 20 receives commands to be performed later, i.e., the NEXT commands, from the central controller 10 during its performance of the IMMEDIATE command, converts the NEXT commands into a command form that the automatic guided vehicle 20 can perform, and stores the NEXT commands in its NEXT command storing buffer (not shown). Accordingly, after completion of the IMMEDIATE command, the automatic guided vehicle 20 can directly perform the NEXT command without consuming any time to communicate with central controller 10 to receive the new NEXT command, and commands can be directly carried out in such a manner that the communication time and command analyzing time are greatly reduced.

Further, since the central controller 10 keeps checking and transmitting the NEXT commands to the automatic guided vehicle 20 regardless of the command completion report from the automatic guided vehicle 20, any communication delay with the automatic guided vehicle 20 is prevented.

That is, according to the present invention, the communication time and command analyzing time of the automatic guided vehicle 20 are shortened, and the operational efficiency of the AGV system can be greatly improved.

As stated above, a preferred embodiment of the present invention is shown and described. Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. A method for controlling an automatic guided vehicle system including a plurality of automatic guided vehicles and a central controller for controlling the automatic guided vehicles, the control method comprising the steps of:
   (a) transmitting an IMMEDIATE command from the central controller to the automatic guided vehicle;
   (b) checking by the central controller whether the automatic guided vehicle, which is performing the IMMEDIATE command, can receive a NEXT command;
   (c) transmitting the NEXT command from the central controller to the automatic guided vehicle when it is determined in step (b) that the automatic guided vehicle can receive the NEXT command;
   (d) continuously receiving, analyzing and storing, at the automatic guided vehicle, the NEXT command while the automatic guided vehicle receives and performs the IMMEDIATE command; and
   (e) sequentially performing the NEXT command stored in the automatic guided vehicle after completion of the IMMEDIATE command.

2. The control method of claim 1, further comprising the step, prior to step (b), of:
   checking by the central controller whether there is a NEXT command to send out to the automatic guided vehicle.

3. The control method of claim 1, wherein step (d) comprises the steps of:
   converting the NEXT command into an execution command at the automatic guided vehicle; and
   storing the converted NEXT command at the automatic guided vehicle into a buffer of the automatic guided vehicle.

4. A method for controlling an automatic guided vehicle system including a plurality of automatic guided vehicles and a central controller for controlling the automatic guided vehicles, the control method comprising the steps of:
   (a) transmitting an IMMEDIATE command from the central controller to the automatic guided vehicle;
   (b) checking at the central controller whether there is a NEXT command to send out to the automatic guided vehicle;
   (c) when it is determined in step (b) that there is a NEXT command to send out to the automatic guided vehicle, checking at the central controller whether the automatic guided vehicle, which is performing the IMMEDIATE command, can receive the NEXT command; and
   (d) transmitting the NEXT command from the central controller to the automatic guided vehicle when it is determined in step (c) that the automatic guided vehicle can receive the NEXT command.

5. The control method of claim 4, further comprising continuously receiving, analyzing and storing, at the automatic guided vehicle, the NEXT command while the automatic guided vehicle receives and performs the IMMEDIATE command.

6. The control method of claim 5, further comprising sequentially performing the NEXT command stored in the automatic guided vehicle after completion of the IMMEDIATE command.

7. The control method of claim 5, wherein the NEXT command received at the automatic guided vehicle from the central controller is converted into an execution command at the automatic guided vehicle, and the converted NEXT command is stored at the automatic guided vehicle into a buffer of the automatic guided vehicle.

8. A method for controlling an automatic guided vehicle system including a plurality of automatic guided vehicles and a central controller for controlling the automatic guided vehicles, the control method comprising the steps of:
   (a) receiving a command from the central controller at the automatic guided vehicle;
   (b) checking at the automatic guided vehicle whether the received command is a NEXT command;
   (c) when the received command is not a NEXT command, performing a previously received IMMEDIATE command at the automatic guided vehicle;
   (d) when the received command is the NEXT command, analyzing and converting the NEXT command into an execution command at the automatic guided vehicle; and
   (e) storing the analyzed and converted NEXT command in a buffer in the automatic guided vehicle.

9. The control method of claim 8, further comprising the step, after step (c), of:
   (c1) after performance of the IMMEDIATE command, determining whether a NEXT command is stored in the buffer; and
   (c2) when the NEXT command is stored in the buffer, performing the NEXT command.

* * * * *